United States Patent [19]

Azarevich et al.

[11] 4,408,472
[45] Oct. 11, 1983

[54] APPARATUS FOR THE MACHINING ON CYLINDRICAL SURFACES ON METAL-CUTTING LATHES

[76] Inventors: Gennady M. Azarevich, ulitsa akademika Yangelya, 14, korpus 2, kv. 257; Jury V. Maximov, ulitsa Lesteva 18, kv. 36; Boris I. Akimov, Simonovsky val, 7, korpus 1, kv. 249; Iosif A. Gusyatsky, ulitsa Malaya Bronnaya, 10, kv. 35, all of Moscow, U.S.S.R.

[21] Appl. No.: 242,113

[22] Filed: Mar. 9, 1981

[51] Int. Cl.³ .............................................. B23B 11/00
[52] U.S. Cl. ......................................... 72/71; 82/20; 82/25; 29/90 R; 72/84
[58] Field of Search .................. 82/20, 25; 72/71, 84; 29/90 R, 27 R, 27 C

[56] References Cited

U.S. PATENT DOCUMENTS

| | | | |
|---|---|---|---|
| 2,043,862 | 6/1936 | Newman | 10/89 F |
| 3,387,517 | 6/1968 | Vandersteeg | 82/25 |

*Primary Examiner*—Lowell A. Larson
*Attorney, Agent, or Firm*—Fleit, Jacobson, Cohn & Price

[57] ABSTRACT

An apparatus for the machining of cylindrical surfaces on metal-cutting lathes. The apparatus has a housing, a toolholder with tools and a head with deforming rollers. The toolholder is provided with an opening through which the work passes, and the tools are clamped in the toolholder so that their points are opposite each other. The housing is topped by guides secured in a plane at right angles to the direction of longitudinal feed with provision for rotation during setting-up, and the toolholder is fitted to the guides with provision for floating in the course of machining.

8 Claims, 2 Drawing Figures

APPARATUS FOR THE MACHINING ON CYLINDRICAL SURFACES ON METAL-CUTTING LATHES

The present invention relates to tools used for the machining of metals combined with plastic deformation at the surface and is specially concerned with an apparatus for the machining of cylindrical surfaces.

The invention disclosed can be used to advantage on lathes for the machining of shafts, piston rods of hydraulic cylinders, axles, and similar parts.

Lathes equipped with the disclosed apparatus for the machining of cylindrical surfaces may find application in the automotive and agricultural machine industries, in road machinery building, and elsewhere.

Known in the art is an apparatus for the machining of outside cylindrical surfaces on metal-cutting lathes. It comprises a toolholder with a tool and a head with deforming rollers spaced equidistantly apart all the way along a circumference, the toolholder and head being consecutively arranged in a housing.

In the known apparatus, the toolholder with the tool is movable in the course of setting-up and fixed at rest during machining. This way of fitting imposes variable turning loads on the tool resulting from section- or lengthwise variations of the stock to be removed or hardness or from misalignment of the apparatus relative to the lathe spindle. Anyhow, the accuracy of machining is impaired, especially when the shaft turned is not stiff.

It is an object of the present invention to enhance the accuracy of machining.

Another object of the present invention is to improve the productivity of machining operations.

The essence of the invention is that, in an apparatus for the machining of cylindrical surfaces on a metal-cutting lathe that has a housing in which there are consecutively arranged a toolholder with a tool and a head with deforming rollers, the toolholder is provided with an opening through which the work passes and clamped therein is another tool located so that the points of the two tools are opposite each other. The housing is topped by guides secured in a plane at right angles to the direction of longitudinal feed with provision for rotation during the setting up, and the toolholder being fitted to the guides with provision for floating in the course of machining.

It is expedient that the guides are provided in the form of a disc with a through slot extending diametrically and the tool-holder is given the shape of a rectangular plate arranged in this through slot.

Simple as they are in point of construction, the guides and toolholder of this kind are reliable in operation.

The apparatus for the machining of cylindrical surfaces on metal-cutting lathes provided by the present invention enhances the accuracy of machining simultaneously with increasing labor productivity and extending the life of tools.

A specific embodiment of the present invention will be described hereinafter with reference to the accompanying drawings in which.

Figure 1:
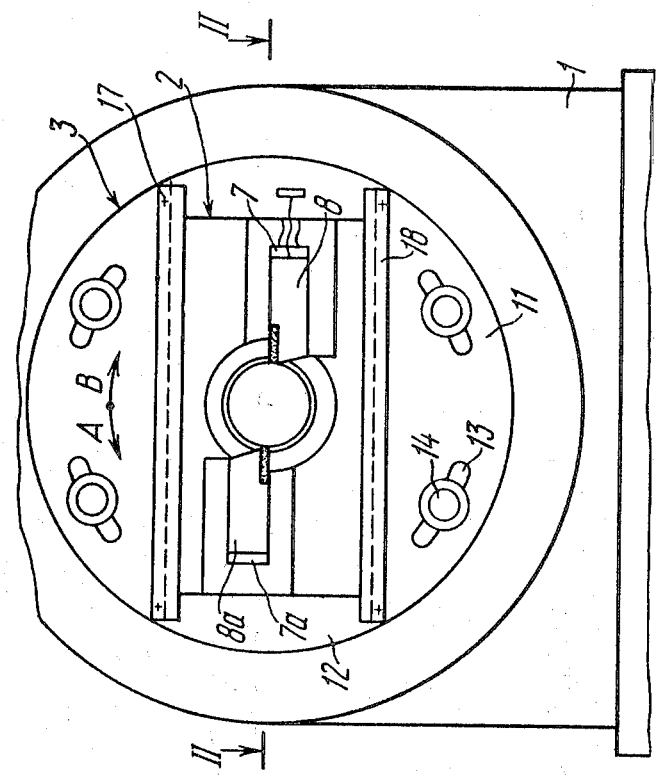
FIG. 1 is a general schematic view of an apparatus for the machining of cylindrical surfaces in accordance with the invention.
Figure 2:
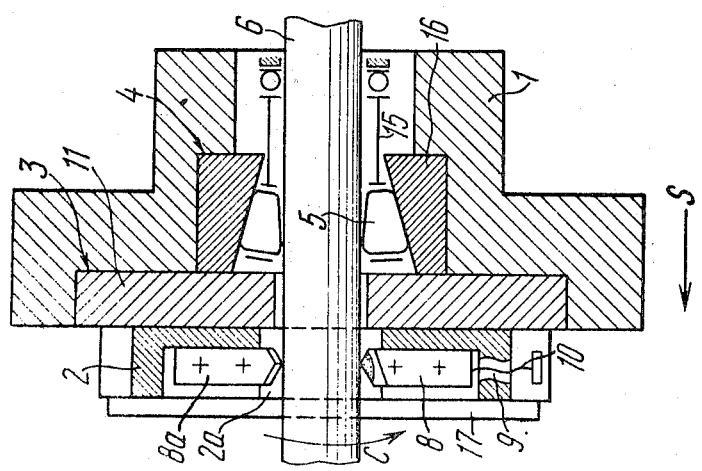
FIG. 2 is a section taken on line II—II in FIG. 1.

An apparatus for the machining of cylindrical surfaces on metal-cutting lathes comprises a housing 1 (FIG. 1), a toolholder 2, guides 3, and a head 4 (FIG. 2) with deforming rollers 5. The toolholder is provided in the form of a rectangular plate with an opening 2a through which work 6 passes and two recesses 7 (FIG. 1) and 7a in which tools 8 and 8a, respectively are located. The recesses 7 and 7a are arranged so that the tools 8 and 8a contained therein are disposed opposite each other, with their points being coaxial. The tool 8 is fitted with provision for adjustment to a given turning diameter, using a kinematic pair comprising a nut 9 (FIG. 2) and a screw 10. The tool 8a is immovably clamped in the toolholder 2.

The toolholder 2 is installed integrally with the tools 8 and 8a in the guides 3 with provision for floating in the course of machining.

The guides 3 are provided in the form of a disc 11 with a through slot 12 extending diametrically to accommodate therein the toolholder 2. The disc 11 is fitted to the housing 1 with provision for rotation during the setting-up, elongated bolt holes 13 (FIG. 1) being provided to that end all the way along its circumference; screws 14 are inserted into the bolt holes 13.

The guides and toolholder can be provided in any other suitable form.

The head 4 is provided with a cage 15 carrying the deforming rollers 5 spaced equidistantly apart all the way along the circumference in slots and contacting a supporting cone 16 contained in the housing 1. The toolholder 2 is held fast in the slot 12 by bars 17 and 18. The cooling system is neither described herein nor shown in the accompanying drawings, being out of the scope of the invention.

The apparatus for the machining of cylindrical surfaces on metal-cutting lathes operates on the following lines.

The housing 1 is installed on the carriage (not shown) of a lathe. The disc 11 is fitted to the housing 1 so that the parallel sides of its slot 12 are arranged in horizontal planes and is secured in place by the screws 14. The elongated bolt holes 13 facilitate the installation, enabling the disc 11 to be turned in any direction indicated by arrows A and B.

The tools 8 and 8a are set at a given turning diameter outside the lathe, using a standard piece of work. The toolholder 2 with the tools 8 and 8a set at the given diameter is inserted into the slot 12 and secured in place by means of the bars 17 and 18. On placing the work 6 between the centres (not shown) of the lathe, the deforming rollers 5 are set by means of the cage 15 at a diameter which depends on the interference to be used in order to obtain a given surface roughness of the work 6. On completing all preparations and admitting the coolant-lubricator into the apparatus, the work is set to rotate in the direction of arrow C and the lathe carriage is fed longitudinally in the direction of arrow S. As the toolholder 2 displaces along the axis of the work at a given rate of feed, the tools 8 and 8a remove the prescribed stock, reducing the work 6 to a size specified for the surface rolling. The deforming rollers 5, travelling in the wake of the tools 8 and 8a, smooth down the minute surface irregularities due to the effect of plastic deformation.

When the machining is completed, the work is taken down from the lathe and the apparatus is returned into its original position where the rollers 5 are automatically reset for the given turning diameter.

In operation, the toolholder 2 is floating at right angles to the longitudinal feed of the lathe carriage in the direction of arrow S, uniformly removing the stock all the way down the work 6. In addition to ensuring high accuracy of machining and good surface finish, the apparatus with the floating tool-holder provides dimensional stability of the tools which equally share the turning load.

A pilot model of the apparatus provided in accordance with the present invention and fitted to a lathe has improved the accuracy of machining up to Class $h_7$-$h_8$ with a simultaneous increase in labor productivity half as much again.

What is claimed is:

1. An apparatus for the machining of cylindrical surfaces on metal-cutting lathes, comprising: a housing, a toolholder having an opening passing therethrough for passage of work being mechined, two tools clamped in said toolholder so that points of the tools are arranged opposite each other, guides located in a plane at right angles to the axis of the work being machined and attached to said housing with provision for rotation during setting-up, said toolholder with said tools being fitted to said guides with provision for floating at right angles to the axis of the work in the course of machining, and a head with deforming rollers contained in said housing.

2. The apparatus as claimed in claim 1, wherein the guides are provided in the form of a disc with a through slot extending diametrically and the toolholder is shaped as a rectangular plate arranged in said through slot.

3. The apparatus as claimed in claim 1, wherein said tools are clamped in position in said toolholder prior to mounting of said toolholder in said guides.

4. The apparatus as claimed in claim 1, wherein a first of said tools is immovably clamped in said toolholder and a second of said tools is adjustable with respect to said toolholder so as to be adjustable to provide a given turning diameter.

5. The apparatus as claimed in claim 1, wherein said guides comprise a disk having a slot receiving said toolholder, said toolholder being shaped as a rectangular plate inserted in said slot, said apparatus further comprising bars secured to said disk to retain said plate in said slot.

6. The apparatus as claimed in claim 1, wherein said guides have surfaces immediately adjacent surfaces of said head so that said guides retain said head in said housing, said guides and said head being replaceable to adjust said apparatus for processing work having another diameter.

7. An apparatus for the machining of cylindrical surfaces on metal-cutting lathes, said apparatus comprising:

a housing translatable during machining of work pieces;

a toolholder having an opening for passage of work pieces;

two tools clamped directly to said toolholder so that points of the tools are arranged opposite each other and the distance between the points is adjustable;

guides located in a plane at right angles to a direction of longitudinal feed of the housing and attached thereto with provision for rotation during setting-up, said guides having a through slot for receiving said toolholder, said toolholder with said tools being fitted to said guides with provision for floating at right angles to the axis of the work in the course of machining; and a head with deforming rollers contained in said housing.

8. The apparatus as claimed in claim 7, wherein the guides are provided in the form of a disc with a through slot extending diametrically and the toolholder is shaped as a rectangular plate arranged in said through slot.

* * * * *

UNITED STATES PATENT AND TRADEMARK OFFICE
CERTIFICATE OF CORRECTION

PATENT NO. : 4,408,472
DATED : Oct. 11, 1983
INVENTOR(S) : Gennady M. AZAREVICH et al It is certified that error appears in the above-identified patent and that said Letters Patent are hereby corrected as shown below:

On the title page and column 1, the title of the application should read:
-- APPARATUS FOR THE MACHINING OF CYLINDRICAL SURFACES ON METAL-CUTTING LATHES --

Signed and Sealed this

Third Day of April 1984

[SEAL]

Attest:

Attesting Officer

GERALD J. MOSSINGHOFF

Commissioner of Patents and Trademarks